United States Patent [19]

Spodig

[11] 4,234,076
[45] Nov. 18, 1980

[54] MAGNETIC ROLLER CONVEYOR

[76] Inventor: Heinrich Spodig, Netteberge 202, 4714 Selm-Bork, Fed. Rep. of Germany

[21] Appl. No.: 793,866

[22] Filed: May 4, 1977

Related U.S. Application Data

[63] Continuation-in-part of Ser. No. 790,140, Apr. 22, 1977, abandoned.

[30] Foreign Application Priority Data

Apr. 24, 1976 [DE] Fed. Rep. of Germany ....... 2617939

[51] Int. Cl.³ ............................................. B65G 39/08
[52] U.S. Cl. .................................... 198/690; 198/679; 271/193
[58] Field of Search ............... 198/422, 679, 690, 780, 198/805; 271/18.1, 18.2, 193; 214/6 D, 6 DS; 414/74, 75

[56] References Cited

U.S. PATENT DOCUMENTS

| 2,726,752 | 12/1955 | Maher | 198/690 |
| 3,224,757 | 12/1965 | Parke et al. | 198/690 |

FOREIGN PATENT DOCUMENTS

| 533757 | 12/1954 | Belgium | 271/193 |
| 571547 | 10/1958 | Belgium | 198/690 |
| 199562 | 9/1958 | Fed. Rep. of Germany | 198/690 |
| 738463 | 10/1955 | United Kingdom | 198/690 |

*Primary Examiner*—Joseph E. Valenza
*Attorney, Agent, or Firm*—Michael J. Striker

[57] ABSTRACT

A magnetic roller conveyor for transporting magnetically conductive objects comprises at least two magnetically conductive rollers and at least two pairs of permanent magnets each located adjacent to and connected with the respective axial end portions of the respective rollers. The magnets of the same pair of magnets are polarized differently with respect to each other, whereas the magnets connected to the same roller are polarized identically with respect to each other. The rollers and the magnets connected thereto form together a magnetically closed path. The rollers are rotatably mounted on magnetically conductive shafts which latter also form a part of the above magnetically closed path. A second magnet system may be provided which is mirror-inverted with respect to the above-mentioned first magnetic system so that force of attraction of the rollers is doubled. Switching members are further provided operative for demagnetizing and subsequently remagnetizing of the rollers.

21 Claims, 12 Drawing Figures

MAGNETIC ROLLER CONVEYOR

This application is a continuation-in-part application of my application Ser. No. 790,140 filed Apr. 22, 1977, now abandoned.

BACKGROUND OF THE INVENTION

The present invention relates to a magnetic roller conveyor for transporting magnetically conductive objects. More particularly, it relates to such magnetic roller conveyor which comprises at least two magnetically conductive rollers, and a magnetic system including permanent magnets located adjacent both axial end portions of the rollers.

Magnetic roller conveyors have been proposed which comprise iron base plates and a plurality of permanent magnets each located at a distance from the respective roller. A free pole of each of the magnets outwardly surrounds the outer circumferential surface of the respective roller so that an air gap is formed between the former and the latter, and therefore no direct magnetic connection is provided between the above members. Such known construction possesses the following disadvantages. In this case magnetic lines of force must pass through the gap formed between the magnets and the respective rollers, and particularly through two gaps for each roller since each roller is provided with two magnets located adjacent the spaced axial ends thereof. This is aggravated by existence of a working air gap formed between the adjacent roller which working gap is more or less overlapped by the transported objects positioned on the roller conveyor. The working air gap and the air gap formed between the magnets and the rollers results in a great magnetic dissipation which weakens the magnetic field of the system and, therefore, reduces the magnetic force of attraction of the roller conveyor.

Another disadvantage of the known construction is that the air gap between the rollers and the magnets becomes clogged by readily magnetizable particles which are contained in ambient dust or are drawn along by the conveyor during the operation of the same. The above clogging of the air gap between the rollers and the magnets hinders and even blocks rotation of the rollers. Finally, such air gap interrupts the magnetic path whereby the magnetic system is permanently demagnetized which results in weakening of the magnetic efficiency of the magnetic roller conveyor.

SUMMARY OF THE INVENTION

Accordingly, it is a general object of the present invention to provide a magnetic roller conveyor which avoids the disadvantages of the prior art magnetic roller conveyors.

More particularly, it is an object of the present invention to provide a magnetic roller conveyor which has a greater force of attraction than the known magnetic roller conveyors.

Another object of the present invention is to provide a magnetic roller conveyor in which magnetic lines of force form a magnetically closed magnetic path, and therefore magnetic dissipation of the system is substantially eliminated, a greater reliability with respect to demagnetization is attained and an improved concentration of the magnetic lines of force is provided, as compared with the known roller conveyors.

Still another object of the present invention is to provide a magnetic roller conveyor in which there are no gaps between rollers and elements of a magnetic system so that no extraneous matters can penetrate therebetween which otherwise would hinder the rotation of the rollers and increase magnetic loss.

In keeping with these objects, and with others which will become apparent hereinafter, one feature of the present invention is that the magnetic roller conveyor, in accordance with the invention, comprises at least two magnetically conductive rollers each having an axis and two axially spaced end portions, and two pairs of permanent magnets each located adjacent and connected with the respective axial end portions of the respective rollers. The magnets of the same pair of magnets are differently polarized with respect to each other, whereas the magnets connected to the axial end portions of the same roller are identically polarized with respect to each other. In this case a magnetically closed path is established between the rollers and the magnets of the above magnetic system. The rollers are mounted on magnetically conductive shafts defining the above axes, which shafts are magnetically connected to the respective rollers and magnets and form a part of the above magnetically closed path.

In such construction magnetic lines of force are concentrated around a working gap between the rollers so that an outer magnetic field is substantially small, a magnetic dissipation outside of the operational zone of the magnetic roller conveyor is substantially eliminated, and the magnetic system is reliable with respect to demagnetization. On the other hand, extraneous matters cannot penetrate between the rollers and the magnets, and therefore the rotation of the rollers is not hindered and the magnetic path is not interrupted by such matters. In the magnetic roller conveyor, in accordance with the present invention, the magnetic system can have an induction of iron substantially between 5000 and 16000 gauss which provides for full saturating the iron in the region of the substantially great working gap between the rollers.

The rollers conveyor is further provided with magnetically conductive guide bars each located adjacent the respective axial end portions of the rollers and supporting the respective magnets. Pole shoes which are provided on the magnets, may be formed as bearings for the axial end portions of the respective rollers. The roller conveyor may be provided with any desirable quantity of the rollers and the pairs of magnets so that they extend along the entire length of the conveyor.

One magnet of each pair of magnets may be formed as a soft iron member. The roller conveyor may be provided with additional two pairs of magnets and guide bars which are mirror-inverted with respect to the above-mentioned pairs of magnets and guide bars so that each pole shoe, and thereby each shaft of the rollers are polarized simultaneously by two magnets. This doubles the force of attraction of the rollers.

Switching members are also provided for demagnetizing and subsequently remagnetizing the rollers, which switching members are located between the respective magnetically conductive parts of the magnetic system and are operative for establishing a further magnetic path excluding the rollers therefrom, and reestablishing the above-mentioned closed magnetic path including the rollers therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2' is a perspective view of a magnetic roller conveyor, in accordance with the present invention, comprising a magnetic system corresponding to that shown in FIG. 2, and further comprising an additional magnetic system which is mirror-inverted with respect to the previously-mentioned magnetic system;

FIGS. 4' and 5' are side views substantially corresponding to that of FIGS. 4 and 5, respectively, but showing the switching means for the conveyor with the magnetic system of FIG. 2;

DESCRIPTION OF THE PREFERRED EMBODIMENTS

Figure 1:
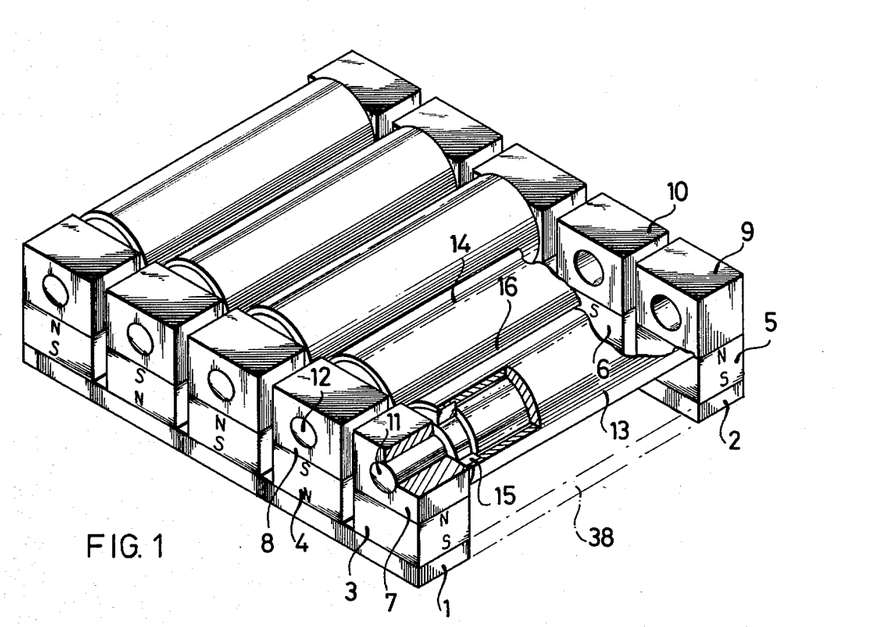
FIG. 1 is a perspective partially sectioned view of a magnetic roller conveyor, in accordance with the present invention, showing five rollers and five pairs of magents located adjacent to and connected to axial end portions of the rollers.

As clearly shown in FIG. 1, a magnetic roller conveyor in accordance with the present invention, comprises two guide bars 1 and 2 of a magnetically conductive material and two pairs of permanent magnets 3, 4 and 5, 6 each mounted on the respective one of the guide bars. The magnets of each pairs of magnets are differently polarized with respect to each other, that is the magnet 3 is differently polarized with respect to the magnet 4, and the magnet 5 is differently polarized with respect to the magnet 6. On the other hand, the magnets located opposite each other are identically polarized with respect to each other, that is the magnet 3 is polarized identically with respect to the magnet 5, and the magnet 4 is polarized identically with respect to the magnet 6. It is understood that a plurality of such pairs of the magnets may be provided, each mounted on the guide bars 1 and 2 and extending along the entire length of the roller conveyor. The magnets 3, 4, 5 and 6 are in contact with the respective guide bars 1 and 2, whereas free portions of the magnets spaced from the portions contacting with guide bars, are provided with pole shoes 7, 8, 9 and 10, respectively.

The roller conveyor comprises at least two rollers 13 and 14 which are preferably formed as hollow cylindrical members of a magnetically conductive material rotatable about substantially coaxial axes. Shafts 11 and 12 of a magnetically conductive material define the axis of the respective rollers 13 and 14 and extend through the hollow interior of the latter. The pole shoes 7, 8, 9 and 10 are formed as bearings for the axially spaced end portions of the respective shafts 11 and 12 of the rollers 13 and 14. Ball bearings 15 are provided between the rollers 13 and 14, and their shafts 11 and 12 for rotating each of the rollers relative to the shafts. The guide bar 1 is magnetically closed with the magnets 3 and 4, and the guide bar 2 is magnetically closed with the magnets 5 and 6 and therefore a magnetically closed path is established including the following elements in the following succession: the magnet 3, the pole shoe 7 of the magnet 3, the axis 11 of the roller 13, the pole shoe 9 of the magnet 5, the magnet 5, the guide bar 2, the magnet 6, the pole shoe 10 of the magnet 6, the axis 12 of the roller 14, the pole shoe 8 of the magnet 4, the magnet 4 and the guide bar 1. The thus-formed closed magnetic path has an open magnetic field only in gap 16 formed between the rollers 13 and 14, such rollers are differently polarized with respect to each other from their shafts 11 and 12. Such open magnetic field is located outside the magnetically closed path and therefore extremely great strength and reliability with respect to demagnetization are provided because this prevents a dispersion of magnetic lines of force.

Figure 2:
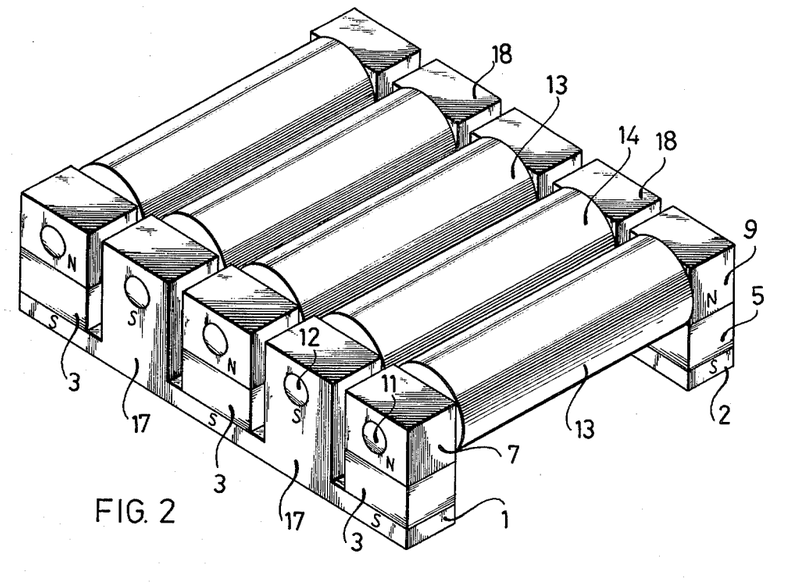
FIG. 2 is a perspective view of a magnetic roller conveyor, in accordance with the present invention, comprising soft iron members located between magnets.

FIG. 2 shows another embodiment of the present invention where the magnetic system of the magnetic roller conveyor comprises two magnets 3 and 5 identical to the respective magnets of the first embodiment of the invention, and two soft iron members 17 and 18 each located adjacent the respective magnets 3 and 5. Similarly to the first embodiment of the invention, the magnets 3 and 5 have the respective pole shoes 7 and 9. The soft iron members 17 and 18 are polarized from the guide bars 1 and 2, respectively, which latter are formed in this case as guide elements of S polarity, so that the soft iron members 17 and 18 form different poles with respect to the pole shoes 7 and 9 of the magnets 3 and 5. Thus, the shaft 11 is polarized differently with respect to the shaft 12. As shown in FIG. 2, the soft iron elements may be made of one-piece with the respective guide bars 1 and 2. It is understood that a plurality of alternating with one another magnets and soft iron members may be provided, extending substantially along the entire length of the magnetic roller conveyor.

Figure 3:
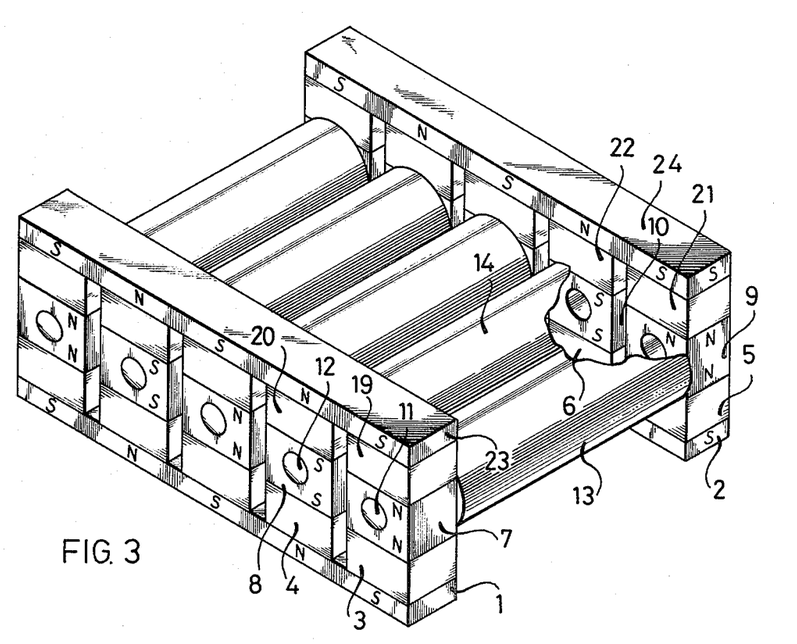
FIG. 3 is a perspective view of a magnetic roller conveyor, in accordance with the present invention, comprising a magnetic system corresponding to that shown in FIG. 1, and further comprising an additional magnetic system which is mirror-inverted with respect to the previously-mentioned magnetic system.

Still another embodiment of the present invention provides for further improving the magnetic characteristics of the magnetic system of the magnetic roller conveyor and is shown in FIG. 3. Similarly to the embodiment shown in FIG. 1, the magnetic roller conveyor shown in FIG. 3 comprises two rollers 13 and 14, two pairs of magnets 3, 4 and 5, 6 and two pairs of poles shoes 7, 8 and 9, 10 each mounted on the respective magnet. In accordance with the embodiment shown in FIG. 3, two additional pairs of magnets 19, 20 and 21, 22, and two additional guide bars 23 and 24 are provided which are mirror-inverted with respect to the previously-mentioned pairs of magnets and guide bars. Each of the additional magnets 19, 20, 21 and 22 is mounted on a portion of the respective pole shoe spaced from the portion thereof contacting with the magnets of the previously-mentioned pairs. In the thus-formed magnetic system each of the poles shoes 7 and 8 are simultaneously polarized from two magnets 3, 19 and 4, 20, respectively, whereas each of the poles shoes 9 and 10 is simultaneously polarized from two magnets 5, 21 and 6, 22, respectively. This means that the force of attraction of the rollers 13 and 14 are actually doubled. It is understood that, as clearly shown in FIG. 3, a plurality of additional magnets which are mirror-inverted with respect to the plurality of the previously-mentioned magnets may be provided, so that the above doubled magnetic system extends along the entire length of the magnetic roller conveyor. The additional guide bars 23 and 24 are formed as cover plates for the magnetic system.

FIG. 3 shows the mirror-inverted magnetic system derived from the construction shown in FIG. 1. FIG. 2a shows the similar mirror-inverted magnetic derived from the construction shown in FIG. 2. Thus, the additional magnetic system is provided including additional soft iron members and additional magnets which are mirror-inverted with respect to the previously-mentioned soft iron members and magnets. The first-mentioned and additional soft iron members are located at opposite sides of the shafts, whereas the first-mentioned and additional magnets are located at opposite sides of the respective pole shoes. It is advantageous when each two of the soft iron members which are connected to the opposite guide bars 1 and 2 and are mirror-inverted with respect to each other are formed as one-piece members. The thus-formed magnetic system, similarly to the embodiment shown in FIG. 3, doubles the force or attraction of the rollers 13 and 14.

Figure 4:
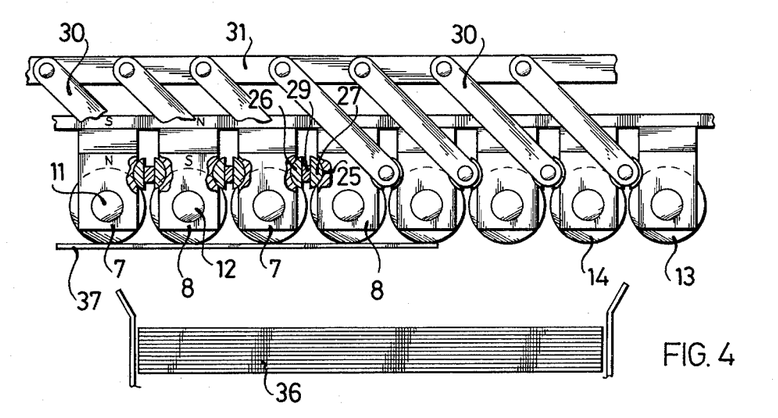
FIG. 4 is a side view of a magnetic roller conveyor in accordance with the present invention showing means for switching on and switching off the magnetic field of the conveyor with the magnetic system of FIG. 1, which means are shown in their switching on position.
Figure 5:
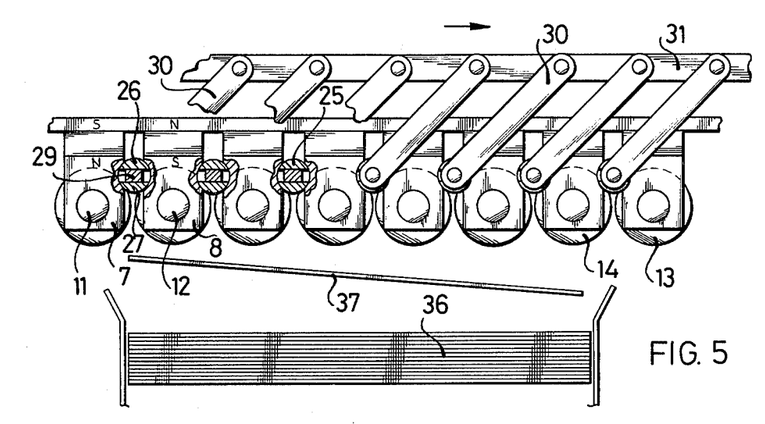
FIG. 5 is a side view of a magnetic roller conveyor in accordance with the present invention showing the above-mentioned switching means in their switching off position.

The magnetic system of the magnetic roller conveyor, in accordance with the invention, may be provided with means for switching off and switching on the system, that is with means for demagnetizing and subsequently remagnetizing the rollers 13 and 14. FIG. 4 shows the above means provided in the roller conveyor which is formed in accordance with the embodiment shown in FIG. 1. The means include a plurality of switching members 25 each located between the pole shoes 7, 8 and 9, 10 of the respective magnets. The switching member 25 comprises two segmentally-shaped elements 26 and 27 of a magnetically conductive material, and a connecting element 29 of a magnetically non-conductive material located between and connected with each of the segment elements 26 and 27. Each of the switching members 25 is fixedly connected to an arm 30, which latter is in turn pivotally connected to a a bar 31. In accordance with the invention, all the switching members 25 located adjacent to one axial end of the rollers 13 and 14 are connected to one common bar 31, whereas all the switching elements 25 adjacent to the other axial end of the rollers 13 and 14 are jointly connected to the other common bar 31. FIGS. 4 and 5 show the switching elements 25, the arms 30 and the bar 31 located adjacent to one axial end of the rollers 13 and 14.

FIG. 4 shows the switching elements in the position of switching on, whereas FIG. 5 shows the same in the position of switching off. For turning the system from the above first position mentioned to the above second-mentioned position, the bar 31 is moved in the direction of the arrow shown in FIG. 5, whereby the arms 30 are turned about pivot axes and moved to a position opposite to the positions shown in FIG. 4 through 90°. The arms 30 turn the switching members 25 to a position shown in FIG. 5. In the latter position the magnetically conductive segments 26 and 27 of the switching members 25 magnetically close the adjacent pole shoes 7, 8 and 9, 10 with each other so that a new magnetic path is established which new path passes not through the axes 11 and 12 of the rollers 13 and 14, but through the magnetically conductive elements 26, 27 and the adjacent poles 7, 8 and 9, 10.

While the switching members 25 and their interjunction with the respective parts of the roller conveyor is shown with respect to the construction disclosed in FIG. 2, it is understood that the switching members may be similarly provided in the roller conveyor formed in accordance with the embodiment shown in FIG. 2, in which case such switching elements operate similarly to those shown in FIGS. 4 and 5. This is shown in FIGS. 4' and 5'.

The roller conveyor shown in FIGS. 4 and 5 does not depend on specific constructions of different embodiments when objects to be transported are moved while being suspended. As shown, for instance in FIGS. 4 and 5, an individual plate 37 can be taken from a stack of plates 36 by the rollers 13 and 14 and thereafter be transported by rotation of the roller to a working position.

Figure 6:
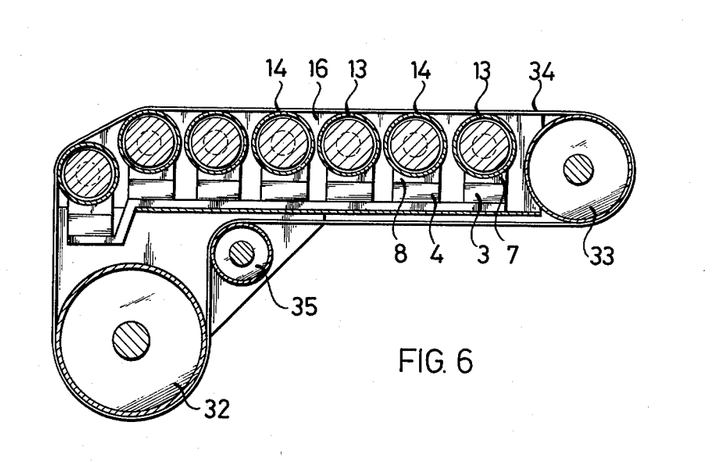
FIG. 6 is a sectioned side view of the conveyor, in accordance with the present invention, substantially corresponding to that shown in FIG. 1 and further comprising an endless transporting belt.

In accordance with still further embodiment of the present invention, the roller conveyor may be provided with guide rollers 32 and 33 of a non-magnetic material located outwardly beyond the extreme magnetic roller, and an endless belt 34 of a magnetically conductive material. The magnetically conductive belt 34 is substantially thin, and has such a small thickness that when the belt 34 is magnetically saturated it does not adhere to the rollers 13 and 14. When the belt 34 is saturated, its upper run has such a force of attraction that the respective objects adhere thereto so as to be transported by the latter. The belt 34 is preferably used in the case when the objects to be transported have dimensions less than the dimension of the gap 16 between the rollers 13 and 14. In accordance with this embodiment of the invention, the belt 34 may be provided with a tension roller 35.

Figure 7:
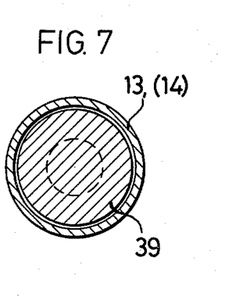
FIG. 7 is a view showing a cross-section of a roller of a magnetic roller conveyor and of a shaft located therein.
Figure 8:
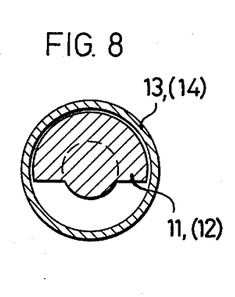
FIG. 8 is a view substantially corresponding to that of FIG. 6 and showing another embodiment of a shaft of a roller of a magnetic roller conveyor.
Figure 9:
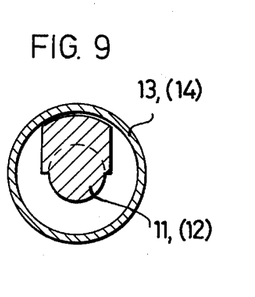
FIG. 9 is a view substantially corresponding to that of FIG. 8 and showing still further embodiment of a shaft of a roller conveyor.

FIGS. 7, 8 and 9 show constructions of the shafts 11 and 12 of the rollers 13 and 14. As shown in FIGS. 8 and 9, each of the shafts 11 and 12 has a segmental cross-section extending over a length corresponding to the length of the hollow interior of the rollers 13 and 14, that is to the length between the portions of the shafts 11 and 12 located in the respective bearings. As shown in FIG. 7, contrary to this each of the shafts may be formed as solid cylindrical members whose outer surface substantially corresponds to the inner surface of the hollow interior of the respective rollers 13 and 14 so that only a small annular gap is formed between the former and the latter.

Preferably, the segmental cross-section of the shafts extends through an angle of approximately 180°, but it also may extend through a smaller or greater angle. The shafts 11 and 12 formed with the segmental cross-sections, can be adjusted with respect to the gap 16 so that a central point of the magnetic field is located above or below the gap 16. This adjustment may be performed from outside by rotating the shafts 11 and 12 in the respective bearings about the axes of the shafts.

When the rollers 13 and 14 rotate at high speeds or are in operation during an essentially great period of time, they become heated. Cooling means may be provided for cooling the rollers, which cooling means may be formed as cooling conduits extending through the rollers 13 and 14 or preferably through their shafts 11 and 12 so as to maintain the heating of the roller within the desirable limits.

When an access to the lower part of the roller conveyor is not required, the quide bars 1 and 2 may be replaced by plates 38 simultaneously supporting both axially spaced pairs of magnets, which plates are shown in dashed lines in FIG. 1.

It will be understood that each of the elements described above, or two or more together, may also find a useful application in other types of constructions differing from the types described above.

While the invention has been illustrated and described as embodied in a magnetic roller conveyor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A magnetic roller conveyor for transporting magnetically conductive objects, comprising at least two magnetically conductive roller elements each having an axis, each of said roller elements having a first end portion and a second end portion axially spaced from one another; and a magnetic system for polarizing said roller elements including at least a first pair of magnetic elements located adjacent and magnetically connected with each other and to said first end portions of the respective roller elements, and at least a second pair of magnetic elements located adjacent to and magnetically connected with each other and to said second end portions of the respective roller elements, the magnetic elements of each of the pairs being differently polarized with respect to each other, and the magnetic elements of each of said first and said second end portions of the respective roller element being identically polarized with respect to each other, so that said two roller elements and said first and said second pairs of said magnetic elements together form a closed magnetic path; a first magnetically conductive guide member supporting and magnetically connecting with each other the magnetic elements of said first pair, and a second magnetically conductive guide member supporting and magnetically connecting with each other the magnetic elements of said second pair; and at least two magnetically conductive shafts each defining said axis and magnetically connected with the respective roller and the two magnetic elements connected to the end portions of the latter, each of said shafts having two end sections axially spaced from each other, and each of said magnetic elements having one portion supported by the respective guide member and the other portion spaced from said supporting portion, said other portion of said magnetic element being provided with a pole shoe formed as a bearing for the respective end sections of the respective shaft.

2. The conveyor as defined in claim 1, wherein said magnets are permanent magnetic elements.

3. The conveyor as defined in claim 1, wherein said rollers are cylindrical.

4. The conveyor as defined in claim 1; and further comprising at least two additional such magnetically conductive roller elements, at least one additional such first pair of magnetic elements and at least one additional such second pair of magnetic elements, said first and second guide members being elongated in a direction substantially lengthwise said conveyor and each supporting and magnetically connecting with each other the magnetic elements of the respective additional pair of said magnetic elements.

5. The conveyor as defined in claim 4, wherein said first and said second guide members each has a length substantially corresponding to the length of said conveyor.

6. A magnetic roller conveyor for transporting magnetically conductive objects, comprising at least two magnetically conductive roller elements each having an axis, each of said roller elements having a first end portion and a second end portion axially spaced from one another; and a magnetic system for polarizing said roller elements including at least a first pair of magnets located adjacent and magnetically connected with each other and to said first end portions of the respective roller elements, and at least a second pair of magnets located adjacent to and magnetically connected with each other and to said second end portions of the respective roller elements, the magnets of each of the pairs being differently polarized with respect to each other, and the magnets of each of said first and said second end portions of the respective roller element being identically polarized with respect to each other, so that said two roller elements and said first and said second pairs of said magnets together form a closed magnetic path; a first magnetically conductive guide member supporting and magnetically connecting with each other the magnets of said first pair, and a second magnetically conductive guide member supporting and magnetically connecting with each other the magnets of said second pair; and at least two magnetically conductive shafts each defining said axis and magnetically connected with the respective roller and the two mangets connected to the end portions of the latter, each of said shafts having two end sections axially spaced from each other, and each of said magnets having one portion supported by the respective guide member and the other portion spaced from said supporting portion, said other portion of said magnet being provided with a pole shoe formed as a bearing for the respective end sections of the respective shaft.

7. The conveyor as defined in claim 6, wherein the magnets of said first pair and said second pairs are located at one side of said pole shoes; and further comprising one further such first pair, one further such second pair of magnets and one further pair of such magnetically conductive guide members located at the other side of said pole shoes and forming a further magnetically closed path which is mirror-inverted with respect to said magnetically closed path so as to polarize each of said pole shoes simultaneously by two magnets located at both sides thereof.

8. The conveyor as defined in claim 7, wherein said one further pair of magnetically conductive guide members are formed as cover plates.

9. A magnetic roller conveyor for transporting magnetically conductive objects, comprising at least two magnetically conductive roller elements each having an axis, each of said roller elements having a first end portion and a second end portion axially spaced from one another; and a magnetic system for polarizing said roller elements including at least a first magnet and a first soft iron member located adjacent and magnetically connected with each other and to said first end portions of the respective roller elements, and at least a second magnet and a second soft iron member located adjacent to and magnetically connected with each other and to said second end portions of the respective roller elements, the magnet and the soft iron member of each of the pairs being differently polarized with respect to each other, and the magnets and the soft iron members of each of said first and said second end portions of the respective roller element being identically polarized with respect to each other, so that said two roller elements and said first and said second magnet and soft iron members together form a closed magnetic path; a first magnetically conductive guide member supporting and magnetically connecting with each other said first magnet and said first soft iron member, and a second magnetically conductive guide member supporting and magnetically connecting with each other said second magnet and said second soft iron member; and at least two magnetically conductive shafts each defining said axis and magnetically connected with the respective roller and the magnets and the soft iron members connected to the end portions of the latter, each of said shafts having two end sections axially spaced from each other, and each of said magnets and said soft iron members having one portion supported by the respective guide member and the other portion spaced from said supporting portion, said other portion of said magnets and said soft iron members being provided with a pole shoe formed as a bearing for the respective end sections of the respective shaft.

10. The conveyor as defined in claim 9, wherein said soft iron members are located substantially at one side of said shafts and said magnets are located at one side of said pole shoes; and further comprising two further such soft iron members and two further such magnets located at the other side of said shafts and said pole shoes, respectively, and forming a further magnetically closed path which is mirror-inverted with respect to said mangetically closed path so that each of said shaft and said pole shoes is polarized simultaneously by said first-mentioned and said further soft iron members and by said first-mentioned and said further magnets, respectively.

11. The conveyor as defined in claim 10, wherein each of said first mentioned soft iron members is formed of one-piece with the respective one of said further soft iron members which latter is mirror-inverted with respect to the former.

12. The conveyor as defined in claim 1; and further comprising means for demagnetizing and subsequently magnetizing said roller elements, said means including a plurality of switching members.

13. The conveyer as defined in claim 12, wherein each of said switching members comprises two magnetically conductive elements connected with each other by a magnetically non-conductive element, each of said switching members being movable between an inoperative position in which said magnetically conductive elements magnetically connect the respective parts of said magnetic system so as to establish an additional magnetic path excluding said roller elements and to thereby interrupt said magnetically closed path, and operative position in which said magnetically conductive elements disconnect said respective parts of magnetic system so as to reestablish said magnetically closed path including said roller elements.

14. The conveyor as defined in claim 13, wherein each of said switching members is located between each of said magnetic elements and the pole shoe of said magnetic element.

15. The conveyor defined in claim 14, wherein each of said switching members is located between the pole shoes of the magnetic elements of each of said pairs of magnetic elements.

16. The conveyor as defined in claim 13, wherein at least one magnetic element of said first pair of magnetic elements and at least one magnetic element of said second pair of magnetic elements connected to the same roller are formed as a soft iron member each supported by and magnetically connected with the respective guide member so as to be polarized by the latter, the other magnetic element of each of said pairs of magnetic elements being formed as a magnet, each of said switching members being located between each of said soft iron members and the respective one of the magnets of the same pair of magnetic elements.

17. The conveyor as defined in claim 16, wherein each of said switching member is located between each of said iron members and the pole shoe of the respective magnetic elements of the same pair of magnets.

18. The conveyor as defined in claim 13, wherein each of said switching members is rotatable about an axis coaxial with said axes of said roller elements.

19. The conveyor as defined in claim 13, wherein said plurality of said switching members includes a first group of switching members located adjacent said first pair of magnetic elements, and a second group of switching members located adjacent said second pair of magnetic elements; and further comprising means for moving said switching members between said positions including a first bar operative for jointly moving said first group of switching members and a second bar operative for jointly moving said second group of said switching members.

20. The conveyor as defined in claim 19, wherein said means further include a plurality of connecting arms each having two spaced end portions, one of which end portions being fixedly connected to the respective switching member, and the other end portion being pivotally connected to the respective one of said bars.

21. The conveyor as defined in claim 1; and further comprising a magnetically conductive endless belt operative for rotating said roller elements.

* * * * *